United States Patent
Yu

(10) Patent No.: US 11,431,633 B2
(45) Date of Patent: Aug. 30, 2022

(54) LABEL FORWARDING ENTRY GENERATION METHOD AND APPARATUS, PACKET SENDING METHOD AND APPARATUS, AND DEVICE

(71) Applicant: HUAWEI TECHNOLOGIES CO., LTD., Guangdong (CN)

(72) Inventor: Shusong Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/136,590

(22) Filed: Dec. 29, 2020

(65) Prior Publication Data

US 2021/0119917 A1    Apr. 22, 2021

Related U.S. Application Data

(63) Continuation of application No. PCT/CN2019/093701, filed on Jun. 28, 2019.

(30) Foreign Application Priority Data

Jun. 29, 2018   (CN) .......................... 201810701350.9

(51) Int. Cl.
*H04L 12/28*     (2006.01)
*H04L 45/748*    (2022.01)
(Continued)

(52) U.S. Cl.
CPC ............ *H04L 45/748* (2013.01); *H04L 45/12* (2013.01); *H04L 45/507* (2013.01)

(58) Field of Classification Search
CPC ..... H04L 45/748; H04L 45/12; H04L 45/507; H04L 45/20; H04L 45/22; H04L 45/28
See application file for complete search history.

(56) References Cited

U.S. PATENT DOCUMENTS 8,593,986 B2    11/2013  Vasseur et al.
9,660,897 B1*    5/2017  Gredler .................. H04L 45/50
(Continued)

FOREIGN PATENT DOCUMENTS

CN    105721303 A    6/2016
CN    107566272 A    1/2018
(Continued)

OTHER PUBLICATIONS

Extended European Search Report issued in European Application No. 19825057.3 dated Jun. 25, 2021, 12 pages.
(Continued)

*Primary Examiner* — Abdelnabi O Musa
(74) *Attorney, Agent, or Firm* — Fish & Richardson P.C.

(57) ABSTRACT

This application provides an example label forwarding entry generation method, applied to a first network device. The method includes obtaining a first packet sent by a second network device, where the first packet carries an address of a third network device and a prefix segment identifier of the third network device, the first network device and the second network device belong to a first area, and the third network device belongs to a second area. The method also includes determining a routing entry that matches the address of the third network device, where the routing entry includes an address of a next-hop network device of the first network device. The method further includes generating a label forwarding entry based on the prefix segment identifier and the address of the next-hop network device.

18 Claims, 3 Drawing Sheets

(51) Int. Cl.
*H04L 45/12* (2022.01)
*H04L 45/50* (2022.01)

(56) References Cited

U.S. PATENT DOCUMENTS

| | | | |
|---|---|---|---|
| 10,270,664 B2 * | 4/2019 | Bashandy | H04L 45/745 |
| 2003/0100334 A1 | 5/2003 | Mazzara | |
| 2008/0205401 A1 * | 8/2008 | Mirtorabi | H04L 45/52 |
| | | | 370/392 |
| 2014/0269266 A1 * | 9/2014 | Filsfils | H04L 43/50 |
| | | | 370/228 |
| 2016/0021000 A1 | 1/2016 | Previdi et al. | |
| 2016/0173363 A1 * | 6/2016 | Torvi | H04L 45/32 |
| | | | 370/401 |
| 2017/0054626 A1 * | 2/2017 | Sivabalan | H04L 12/4662 |
| 2017/0230274 A1 * | 8/2017 | Filsfils | H04L 45/02 |
| 2018/0359176 A1 * | 12/2018 | Nainar | H04L 45/34 |
| 2018/0375763 A1 * | 12/2018 | Brissette | H04L 49/35 |
| 2019/0007372 A1 * | 1/2019 | Bhat | H04L 45/16 |
| 2019/0104058 A1 * | 4/2019 | Filsfils | H04L 45/02 |
| 2020/0153733 A1 * | 5/2020 | Chunduri | H04L 45/38 |

FOREIGN PATENT DOCUMENTS

| | | |
|---|---|---|
| CN | 107888493 A | 4/2018 |
| CN | 107968752 A | 4/2018 |
| CN | 108023815 A | 5/2018 |
| CN | 105453513 B | 10/2018 |
| WO | 2017141078 A1 | 8/2017 |

OTHER PUBLICATIONS

Previdi, Ed. et al., "IS-IS Extensions for Segment Routing draft-ietf-isis-segment-routing-extensions-16," IS-IS for IP Internets, Internet-Draft, Apr. 19, 2018, 35 pages.
Nokia, "Segment Routing and Path Computation Element," Technology White Paper, Sep. 24, 2016, 36 pages.
Office Action issued in Chinese Application No. 201810701350.9 dated Nov. 5, 2020, 6 pages (with English translation).
Office Action issued in Chinese Application No. 201810701350.9 dated May 20, 2020, 9 pages (with English translation).
PCT International Search Report and Written Opinion issued in International Application No. PCT/CN2019/093701 dated Sep. 17, 2019, 15 pages (with English translation).

* cited by examiner

LABEL FORWARDING ENTRY GENERATION METHOD AND APPARATUS, PACKET SENDING METHOD AND APPARATUS, AND DEVICE

CROSS-REFERENCE TO RELATED APPLICATIONS

This application is a continuation of International Application No. PCT/CN2019/093701, filed on Jun. 28, 2019, which claims priority to Chinese Patent Application No. 201810701350.9, filed on Jun. 29, 2018. The disclosures of the aforementioned applications are hereby incorporated by reference in their entireties.

TECHNICAL FIELD

This application relates to the communications field, and in particular, to a label forwarding entry generation method and apparatus, a packet sending method and apparatus, and a device.

BACKGROUND

Segment routing (SR) is a method designed based on a source routing concept to forward a data packet on a network. During segment routing, a network path is divided into several segments, and segment identifiers (SID) are assigned to these segments and forwarding nodes on the network. A forwarding path may be obtained by arranging the segment identifiers of the segments and the network nodes in order. Segment routing best effort (SRBE) is an optimal forwarding path during segment routing that is calculated by using a shortest path algorithm of an interior gateway protocol (IGP).

According to the interior gateway protocol, one domain may be divided into a plurality of areas, and each area includes one or more network devices. A network device in an area may learn of routing information of the other network devices in the area through flooding, to implement communication between network devices in the area. Inter-area communication may be implemented by a cross-area network device. Currently, common cross-area communication is implemented by performing route importing on a cross-area network device.

However, this route importing-based manner not only increases impact of route flapping occurring on a network device in an area, but also increases storage pressure of the network device on which route importing is performed.

SUMMARY

Embodiments of this application provide a label forwarding entry generation method and apparatus, a packet sending method and apparatus, and a device, so as to improve stability of a network device and reduce storage pressure of the network device.

An embodiment of this application provides a label forwarding entry generation method, applied to a first network device. The method includes: First, the first network device obtains a first packet sent by a second network device, where the first packet carries an address of a third network device and a prefix segment identifier of the third network device, the first network device and the second network device belong to a first area, and the third network device belongs to a second area. Then, the first network device determines a routing entry that matches the address of the third network device, where the routing entry includes an address of a next-hop network device of the first network device. Finally, the first network device generates a label forwarding entry based on the prefix segment identifier and the address of the next-hop network device.

In this embodiment of this application, the address and the prefix segment identifier of a destination network device of the first network device (that is, the third network device) are sent by the second network device that is located in the same area as the first network device, instead of being obtained through route importing. Therefore, the first area is independent of the second area. When flooding is performed in the second area, the first network device does not receive a routing address of the third network device. Therefore, when route flapping occurs on the third network device, the first network device is not affected.

In addition, assuming that in addition to the third network device, the second area further includes other network devices that do not belong to the first area, the first network device does not receive routing information of these devices. Therefore, storage pressure of the first network is relatively low.

Optionally, the generating a label forwarding entry based on the prefix segment identifier and the address of the next-hop network device includes: first, determining a segment routing global block of the next-hop network device based on the address of the next-hop network device; and then, generating a label of the next-hop network device in the label forwarding entry based on the segment routing global block of the next-hop network device and the prefix segment identifier. Specifically, the label of the next-hop network device may be obtained based on the sum of an initial value of the segment routing global block of the next-hop network device and the prefix segment identifier of the third network device. Certainly, in addition to the label of the next-hop network device, the label forwarding entry may further include an outbound interface corresponding to the routing entry, a local label, a destination address, and the like.

Specifically, if the first network device is an initial network device, the label forwarding entry includes the outbound interface and the label of the next-hop network device, and optionally, may further include the local label and the destination address.

If the first network device is an intermediate network device, the label forwarding entry includes the local label, the outbound interface, and the label of the next-hop network device, and optionally, may further include the destination address.

Optionally, the method further includes: receiving a second packet, where the second packet is used to indicate that a fourth network device belongs to both the first area and the second area, and generating the routing entry in response to receiving the second packet, to lay a foundation for the foregoing generation of the label forwarding entry. The routing entry may be a default routing entry, so that the first network device can automatically find the default routing entry based on the address of the third network device according to a longest mask match principle.

Optionally, a value of an area attached bit of the second packet is used to indicate that the fourth network device belongs to both the first area and the second area. The second packet may be a link state packet.

Based on whether the label forwarding entry stores a destination address, that is, the address of the third network device, the first network device sends a third packet by using different methods. The destination address of the third packet is the address of the third network device.

If the label forwarding entry does not store the destination address, the method further includes: pre-establishing a correspondence between the routing entry and the label forwarding entry; after receiving the third packet, finding the routing entry based on the address of the third network device, and pushing the label of the next-hop network device in the label forwarding entry into the third packet based on the correspondence; and sending the third packet into which the label of the next-hop network device is pushed to the next-hop network device of the first network device.

If the label forwarding entry stores the destination address, the method further includes: after receiving the third packet, directly searching, based on the address of the third network device, the label forwarding entry for the label of the next-hop network device that corresponds to the address of the third network device; then, pushing the label of the next-hop network device into the third packet, and sending the third packet into which the label of the next-hop network device is pushed to the next-hop network device of the first network device.

Certainly, it may be understood that the foregoing two manners do not limit the technical solutions of this application, and a person skilled in the art may design a manner based on an actual situation.

In addition, optionally, the first packet may be a link state packet, and a binding type-length-value field of the first packet may carry the address of the third network device and the prefix segment identifier of the third network device.

Optionally, the first area is a carrier non-backbone area, and the second area is a carrier backbone area.

Correspondingly, an embodiment of this application further provides a packet sending method, applied to a second network device. The method includes: The second network device sends a first packet to a first network device, where the first packet carries an address of a third network device and a prefix segment identifier of the third network device, the first network device and the second network device belong to a first area, and the third network device belongs to a second area, the address of the third network device is used to determine a routing entry corresponding to the third network device, the routing entry includes an address of a next-hop network device of the first network device, and the prefix segment identifier of the third network device and the address of the next-hop network device are used to generate a label forwarding entry of the first network device.

In this embodiment of this application, the address and the prefix segment identifier of a destination network device of the first network device (that is, the third network device) are sent by the second network device that is located in the same area as the first network device, instead of being obtained through route importing. Therefore, the first area is independent of the second area. When flooding is performed in the second area, the first network device does not receive a routing address of the third network device. Therefore, when route flapping occurs on the third network device, the first network device is not affected.

In addition, assuming that in addition to the third network device, the second area further includes other network devices that do not belong to the first area, the first network device does not receive routing information of these devices. Therefore, storage pressure of the first network is relatively low.

Optionally, the second network device further belongs to the second area. The method further includes: sending a second packet to the first network device, where the second packet is used to indicate that the second network device belongs to both the first area and the second area, and the second packet is used to generate the routing entry, to lay a foundation for the foregoing generation of the label forwarding entry. The routing entry is a default routing entry, so that the first network device can automatically find the default routing entry based on the address of the third network device according to a longest mask match principle.

Optionally, a value of an area attached bit of the second packet is used to indicate that a fourth network device belongs to both the first area and the second area.

Optionally, a binding type-length-value field of the first packet carries the address of the third network device and the prefix segment identifier of the third network device.

Optionally, the first area is a carrier non-backbone area, and the second area is a carrier backbone area.

An embodiment of this application further provides a label forwarding entry generation apparatus, applied to a first network device. The apparatus includes: a first obtaining unit, configured to obtain a first packet sent by a second network device, where the first packet carries an address of a third network device and a prefix segment identifier of the third network device, the first network device and the second network device belong to a first area, and the third network device belongs to a second area; a routing entry determining unit, configured to determine a routing entry that matches the address of the third network device, where the routing entry includes an address of a next-hop network device of the first network device; and a label forwarding entry generation unit, configured to generate a label forwarding entry based on the prefix segment identifier and the address of the next-hop network device.

Optionally, the label forwarding entry generation unit is specifically configured to:

determine a segment routing global block of the next-hop network device based on the address of the next-hop network device; and generate a label of the next-hop network device in the label forwarding entry based on the segment routing global block of the next-hop network device and the prefix segment identifier.

Optionally, the apparatus further includes:

a routing entry generation unit, configured to: receive a second packet, where the second packet is used to indicate that a fourth network device belongs to both the first area and the second area; and generate the routing entry in response to receiving the second packet, where the routing entry is a default routing entry.

Optionally, the apparatus further includes:

a correspondence establishment unit, configured to establish a correspondence between the routing entry and the label forwarding entry;

a third packet receiving unit, configured to receive a third packet, where a destination address of the third packet is the address of the third network device;

a matching unit, configured to: find the routing entry based on the address of the third network device, and push the label of the next-hop network device in the label forwarding entry into the third packet based on the correspondence; and a first sending unit, configured to send the third packet into which the label of the next-hop network device is pushed to the next-hop network device of the first network device.

Optionally, the label forwarding entry includes the address of the third network device. The apparatus further includes:

a third packet receiving unit, configured to receive a third packet, where a destination address of the third packet is the address of the third network device;

a search unit, configured to search, based on the address of the third network device, the label forwarding entry for the label of the next-hop network device that corresponds to the address of the third network device; and a second sending unit, configured to: push the label of the next-hop network device into the third packet, and send the third packet into which the label of the next-hop network device is pushed to the next-hop network device of the first network device.

An embodiment of this application further provides a packet sending apparatus, applied to a second network device. The apparatus includes:

a first packet sending unit, configured to send a first packet to a first network device, where the first packet carries an address of a third network device and a prefix segment identifier of the third network device, the first network device and the second network device belong to a first area, the third network device belongs to a second area, the address of the third network device is used to determine a routing entry corresponding to the third network device, the routing entry includes an address of a next-hop network device of the first network device, and the prefix segment identifier of the third network device and the address of the next-hop network device are used to generate a label forwarding entry of the first network device.

Optionally, a value of an area attached bit of the first packet is used to indicate that the second network device belongs to both the first area and the second area.

Optionally, a binding type-length-value field of the first packet carries the address of the third network device and the prefix segment identifier of the third network device.

Optionally, the first area is a carrier non-backbone area, and the second area is a carrier backbone area.

An embodiment of this application further provides a network device. The network device is a first network device. The network device includes a memory and a processor. The memory is configured to store an instruction. The processor is configured to execute the instruction in the memory, to perform the label forwarding entry generation method.

An embodiment of this application further provides a network device. The network device is a second network device. The network device includes a memory and a processor. The memory is configured to store an instruction. The processor is configured to execute the instruction in the memory, to perform the packet sending method.

An embodiment of this application further provides a computer-readable storage medium, including an instruction. When the instruction is run on a computer, the computer is enabled to perform the label forwarding entry generation method.

An embodiment of this application further provides a computer-readable storage medium, including an instruction. When the instruction is run on a computer, the computer is enabled to perform the packet sending method.

An embodiment of this application further provides a computer program product including an instruction. When the computer program product is run on a computer, the computer is enabled to perform the label forwarding entry generation method.

An embodiment of this application further provides a computer program product including an instruction. When the computer program product is run on a computer, the computer is enabled to perform the packet sending method.

DESCRIPTION OF EMBODIMENTS

Figure 1:
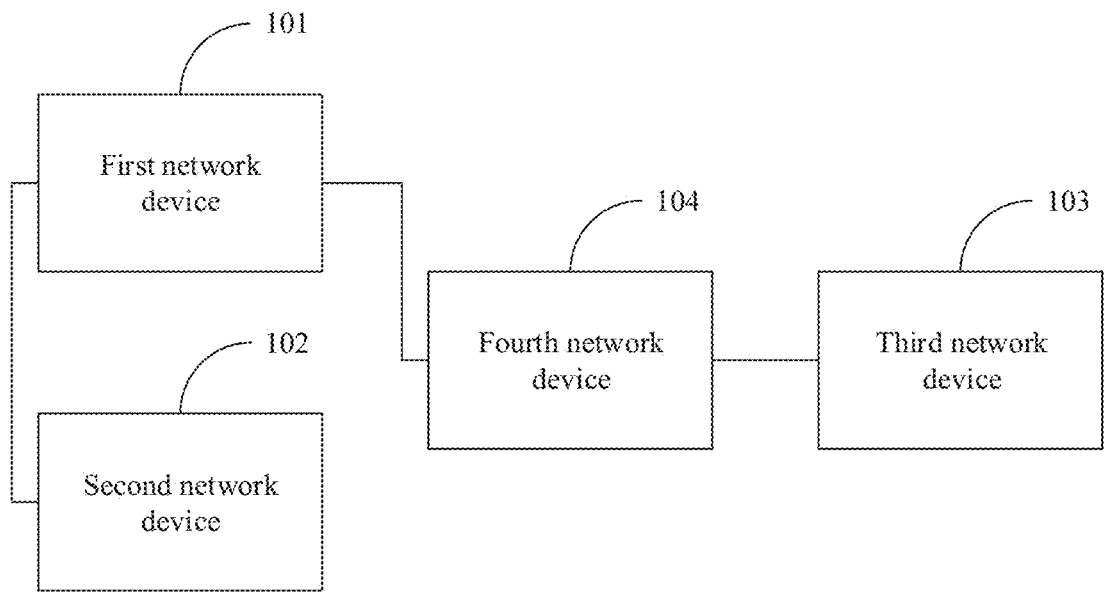
FIG. 1 is a schematic structural diagram of a packet forwarding system according to an embodiment of this application.

Before the technical solutions of this application are described, application scenarios of this application, that is, SRBE and an IGP, are first described.

The SRBE is described above: The SRBE is an optimal forwarding path during segment routing that is calculated by using a shortest path algorithm of the IGP, and is also referred to as a label forwarding path or an SRBE tunnel. The label forwarding path includes a source network device, an intermediate network device, and a destination network device. A packet of the source network device arrives at the destination network device after being forwarded by the intermediate network device. During the SRBE, a packet is forwarded under guidance of a destination address. The destination address is an address of the destination network device, and the destination address may also be referred to as a prefix. To implement the forwarding, the source network device needs to learn of routing information of the destination network device in advance, including the address and a prefix segment identifier (prefix SID) of the destination network device. The intermediate network device located between the source network device and the destination network device on the label forwarding path implements packet transmission by performing label switching.

The IGP is described above: One domain may be divided into a plurality of areas, and the plurality of areas may include, for example, one carrier backbone area and at least one carrier non-backbone area. Each area includes one or more network devices. A network device in an area may learn of routing information of the other network devices in the area through flooding, to implement communication between network devices in the area. Inter-area communication may be implemented by a cross-area network device. Currently, common cross-area communication is implemented by performing route importing on a cross-area network device.

For example, an area A includes a network device 1 and a network device 2, and an area B includes the network device 2 and a network device 3. In other words, the network device 2 is a cross-area network device, and may communicate with both the network device 1 in the area A and the network device 3 in the area B. Through intra-area flooding, the network device 2 and the network device 1 may learn of respective routing information, and the network device 2 and the network device 3 may also learn of respective routing information. However, the network device 1 cannot directly communicate with the network device 3, because the network device 1 does not learn of the routing information of the network device 3. By performing route importing on the network device 2, a route in the area 2 is imported into the area 1, so that both the network device 2 and the network device 1 can receive the routing information of the network device 3 when flooding is performed in the area 2. Therefore, the network device 1 may access the network device 3.

However, this route importing-based manner not only extends a route flapping range, but also increases storage pressure of a network device on which route importing is performed.

For example, it is assumed that route flapping occurs on the network device 3. Because route importing is performed on the network device 1, the network device 1 is also affected by the route flapping. In addition, if the area 2 further includes other network devices in addition to the network device 2 and the network device 3, even if the network device 1 does not communicate with these network devices, the network device 1 needs to store routing information of these network devices when flooding is performed in the area 2. Consequently, storage pressure of the network device 1 is relatively high.

To resolve the foregoing technical problem, the embodiments of this application provide a label forwarding entry generation method and apparatus, a packet sending method and apparatus, and a device.

The following describes the application scenarios and the technical solutions of this application by using a packet forwarding system as an example.

FIG. 1 is a schematic structural diagram of a packet forwarding system. In FIG. 1, the packet forwarding system includes a first network device 101, a second network device 102, a third network device 103, and a fourth network device 104.

The first network device 101, the second network device 102, and the fourth network device 104 belong to a first area, and the third network device 103 and the fourth network device 104 belong to a second area. In other words, the fourth network device 104 is a cross-area network device.

In this embodiment of this application, the first network device 101, the second network device 102, the third network device 103, and the fourth network device 104 each may be a router, a switch, a forwarding device in a software-defined networking (SDN) architecture, or the like. This is not specifically limited in this application.

In this embodiment of this application, the first network device 101 needs to access the third network device 103. Therefore, the first network device 101 needs to obtain routing information of the third network device 103, that is, an address and a prefix segment identifier of the third network device 103. In this embodiment of this application, the second network device 102 is configured with the address and the prefix segment identifier of the third network device 103. The second network device 102 sends a first packet to the first network device 101, and the first packet carriers the address and the prefix segment identifier of the third network device 103. After receiving the first packet, the first network device 101 obtains the address and the prefix segment identifier of the third network device 103 through parsing. Then, the first network device 101 may search, based on the address of the third network device 103, a routing table for a routing entry that matches the address of the third network device 103 in the routing table. The routing entry is generated in advance, and includes an address of a next-hop network device. Finally, the first network device 101 may generate a label forwarding entry of the first network device 101 based on the address of the next-hop network device and the prefix segment identifier of the third network device 103.

Specifically, the label forwarding entry of the first network device 101 may include the following information: a local label (if the first network device 101 is an initial network device, the label forwarding entry may not include the local label), an outbound interface, and a label of the next-hop network device. In this embodiment of this application, the local label is generated based on a segment routing global block (SRGB) of the first network device 101 and the prefix segment identifier of the third network device 103. The outbound interface is an outbound interface corresponding to the routing entry. The label of the next-hop network device is generated based on a segment routing global block of the next-hop network device and the prefix segment identifier of the third network device 103. The SRGB is a multi-protocol label switching (MPLS) range that is specified by a user and that is reserved for SR.

When the first network device 101 receives a third packet sent by another network device, and a destination address of the third packet is the address of the third network device 103, the first network device 101 needs to send the third packet to the third network device 103.

Because the first network device 101 is an initial network device of the third packet, there may be two packet sending methods based on whether the label forwarding entry stores the destination address, that is, the address of the third network device 103.

If the label forwarding entry does not store the destination address, after generating the label forwarding entry, the first network device 101 may establish a correspondence between the routing entry and the label forwarding entry. Then, after receiving the third packet, the first network device 101 may find the routing entry based on the address of the third network device 103, and push the label of the next-hop network device in the label forwarding entry into the third packet based on the correspondence. Next, the first network device 101 sends the third packet into which the label of the next-hop network device is pushed to the next-hop network device of the first network device 101.

If the label forwarding entry stores the address of the third network device 103, the first network device 101 may directly search, based on the address of the third network device 103, the label forwarding entry for the label of the next-hop network device that corresponds to the address of the third network device 103, push the label of the next-hop network device into the third packet, and send the third packet into which the label of the next-hop network device is pushed to the next-hop network device of the first network device 101.

Certainly, the foregoing two manners do not limit the technical solutions of this application, and a person skilled in the art may design a manner based on an actual situation.

It is assumed that the next-hop network device of the first network device 101 is the fourth network device 104. Because the fourth network device 104 and the third network device 103 belong to the same area, the fourth network device 104 may pre-obtain the address and the prefix segment identifier of the third network device 103 through flooding in the second area. Therefore, a label forwarding entry of the fourth network device 104 may be generated. The label forwarding entry may include a destination address (that is, the address of the third network device 103), a local label (generated based on a segment routing global block of the fourth network device 104 and the prefix segment identifier of the third network device 103), an outbound interface (an outbound interface corresponding to a routing entry of a next-hop network device), and an outgoing label (generated based on a segment routing global block of the next-hop network device and the prefix segment identifier of the third network device 103).

After receiving the third packet sent by the first network device 101, the fourth network device 104 searches, based on a label carried in the third packet, that is, the local label of the fourth network device 104, the label forwarding entry of the fourth network device 104 for a label of the next-hop network device of the fourth network device 104, then replaces the label carried in the third packet with the label of the next-hop network device of the fourth network device 104, and sends the third packet obtained after the label replacement to the next-hop network device through the outbound interface corresponding to the routing entry of the next-hop network device.

It is assumed that the next-hop network device of the fourth network device 104 is the third network device 103. Because the third network device 103 is a destination address, a destination address of a label forwarding entry corresponding to the third network device 103 is the address of the third network device 103. The local label is obtained based on a segment routing global block of the third network device 103 and the prefix segment identifier of the third network device 103, the outbound interface is a local interface, and the outgoing label is null.

After receiving the third packet forwarded by the fourth network device 104, the third network device 103 searches a label forwarding entry of the third network device 103 based on the label carried in the third packet, that is, the label of the third network device 103. Because the third network device 103 finds that the outgoing label is null, in other words, learns that a destination node of the third packet is the third network device 103, the third network device 103 stops forwarding the third packet, and performs corresponding processing.

In the entire process of forwarding the third packet, the address and the prefix segment identifier of the third network device 103 are forwarded by the second network device 102 to the first network device 101 through the first packet instead of route importing. Therefore, the first area is still independent of the second area. When flooding is performed in the second area, the first network device 101 in the first area cannot receive the routing information of the third network device 103 in the second area. Therefore, when route flapping occurs on the third network device 103, the first network device is not affected. In addition, when the second area further includes other network devices in addition to the third network device 103 and the fourth network device 104, the first network device does not need to store routing information of these network devices when flooding is performed in the second area, so as to reduce storage pressure of the first network device 101.

Figure 2:
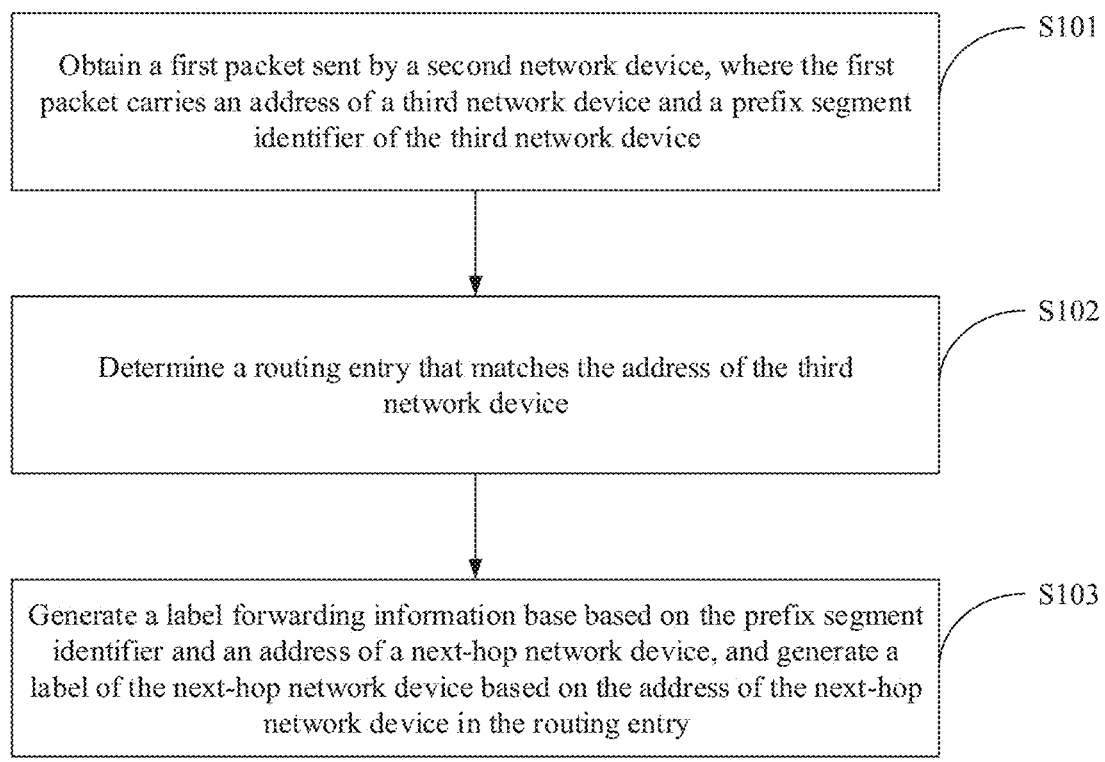
FIG. 2 is a schematic flowchart of a label forwarding entry generation method according to an embodiment of this application.

FIG. 2 is a schematic flowchart of a label forwarding entry generation method according to an embodiment of this application.

The label forwarding entry generation method provided in this embodiment of this application may be applied to a first network device, and specifically includes the following steps.

S101: Obtain a first packet sent by a second network device, where the first packet carries an address of a third network device and a prefix segment identifier of the third network device.

In this embodiment of this application, the first network device, the second network device, the third network device, and a fourth network device to be mentioned below each may be a router, a switch, or the like. This is not specifically limited in this application.

The first network device and the second network device belong to a first area, and the third network device belong to a second area.

Optionally, the first area may be a carrier non-backbone area, and the second area may be a carrier backbone area. Specific names of the carrier backbone area and the carrier non-backbone area vary with an interior gateway protocol. In an example of an intermediate system to intermediate system (IS-IS) protocol, the carrier non-backbone area is referred to as an L1 area, and the carrier backbone area is referred to as an L2 area. In an example of an open shortest path first (OSPF) protocol, the carrier backbone area is referred to as an area 0, and the carrier non-backbone area is referred to as an area N (N is a positive integer, and is specifically determined by a quantity of carrier non-backbone areas).

In this embodiment of this application, the second network device is preconfigured with the address of the third network device and the prefix segment identifier of the third network device, and then sends, to the first network device, the first packet that carries the address of the third network device and the prefix segment identifier of the third network device. The third network device is a target network device of the first network device. After receiving the first packet sent by the second network device, the first network device parses the first packet to obtain the address of the third network device and the prefix segment identifier of the third network device. The address of the third network device may be an Internet Protocol (IP) address, a medium/media access control (MAC) address, or the like.

Optionally, the second network device may be configured as a mapping server to send the first packet. It should be noted that the second network device may be any device in the first area. The second network device may be a device independent of the first network device or the fourth network device to be mentioned below, or may be the first network device or the fourth network device to be mentioned below.

Optionally, the first packet may be a link state packet. The link state packet is a packet that can report a node and link status. A name of the link state packet varies with an IGP. For the IS-IS protocol, the link state packet is referred to as LSP (link state PDU), and for the OSPF protocol, the link state packet is referred to as LSA (link-state advertisement). Specifically, a binding type-length-value (binding TLV) field of the link state packet may carry the address of the third network device and the prefix segment identifier of the third network device.

Specifically, an FEC Prefix field in the binding TLV may carry the address of the third network device, and a Sub-TLVs field in the binding TLV may carry the prefix segment identifier of the third network device. More specifically, the prefix segment identifier of the third network device may be carried in an SID/Index/Label field of the SubTLVs field.

In this embodiment of this application, the address and the prefix segment identifier of a destination network device of the first network device (that is, the third network device) are sent by the second network device that is located in the same area as the first network device, instead of being obtained through route importing. Therefore, the first area is independent of the second area. When flooding is performed in the second area, the first network device does not receive a routing address of the third network device. Therefore, when route flapping occurs on the third network device, the first network device is not affected.

In addition, assuming that in addition to the third network device, the second area further includes other network devices that do not belong to the first area, the first network device does not receive the routing information of these devices. Therefore, storage pressure of the first network is relatively low.

S102: Determine a routing entry that matches the address of the third network device.

After receiving the address of the third network device, the first network device may search a routing table to determine the routing entry corresponding to the third network device. The routing entry includes an address of a next-hop network device of the first network device.

Because the routing entry corresponding to the third network device is not generated through flooding, the corresponding routing entry that matches the address of the third network device needs to be generated in advance. The routing entry may be configured, or may be triggered by an event. For example, the routing entry may be generated when a second packet sent by the fourth network device is received. The second packet is used to indicate that the fourth network device belongs to both the first area and the second area. In other words, the fourth network device is a cross-area network device, and can communicate with both the first network device and the third network device.

The fourth network device may set a value for an area attached bit (ATT bit) of a packet flooded to a network device in the first area, and the value may be 1 or another value. The value may be determined by a person skilled in the art. In this way, the second packet obtained by the first network device carries an area attached bit. It should be noted that the second packet and the packet sent by the fourth network device may be a same packet, or may be different packets. When the fourth network device is a neighboring node of the first network device, the second packet is the packet sent by the fourth network device. When the fourth network device is not a neighboring node of the first network device, the second packet is sent by the neighboring node of the first network device, and is different from the packet sent by the fourth network device.

After receiving the second packet, the first network device parses the second packet to obtain a value of the area attached bit, and then generates the routing entry based on the value of the area attached bit.

The routing entry may include a network device address corresponding to the third network device and an address of a next-hop network device.

When the routing entry is configured or generated, the first network device may not know a device that is used as the destination network device of the first network device, and therefore cannot generate the address of the third network device. However, the first network device may generate an address different from a network device address obtained through flooding, for example, a default routing address, to serve as a corresponding address in the routing entry. Generally, the default routing address is 0.0.0.0. After obtaining the address of the third network device, the first network device may determine, according to a longest mask match principle, the default routing address as the network device address that matches the third network device, to further determine that a routing entry corresponding to the network device is the routing entry. An entry including the default routing address is referred to as a default routing entry.

A next-hop network device in the routing entry is a network device that directly sends the second packet to the first network device, that is, the neighboring node of the first network device. Because the second packet further carries an address of the neighboring node, an address of the next-hop network device is the address of the neighboring node.

For example, the fourth network device first sends a link state packet with an area attached bit 1 to a fifth network device, and then the fifth network device sends, to the first network device, the second packet that carries the area attached bit 1. In this case, the second packet carries an address of the fifth network device, and the address of the next-hop network device in the routing entry is the address of the fifth network device. The fifth network device also belongs to the first area.

S103: Generate a label forwarding entry based on the prefix segment identifier and the address of the next-hop network device, and generate a label of the next-hop network device based on the address of the next-hop network device in the routing entry.

Optionally, the label forwarding entry of the first network device may include the following information: a destination address, a local label, an outbound interface, and the label of the next-hop network device. In this embodiment of this application, the destination address in the label forwarding entry of the first network device is the address of the third network device. The local label is generated based on a segment routing global block of the first network device and the prefix segment identifier of the third network device. For example, the local label may be obtained based on the sum of an initial value of the segment routing global block and the prefix segment identifier of the third network device. The outbound interface is an outbound interface corresponding to the routing entry. The label of the next-hop network device is generated based on a segment routing global block of the next-hop network device and the prefix segment identifier of the third network device. For example, the label of the next-hop network device may be obtained based on the sum of an initial value of the segment routing global block of the next-hop network device and the prefix segment identifier of the third network device.

After generating the label forwarding entry, the first network device may send a third packet. A destination address of the third packet is the address of the third network device. For a specific sending method, refer to the foregoing descriptions of the packet sending system. Details are not described herein again.

Figure 3:
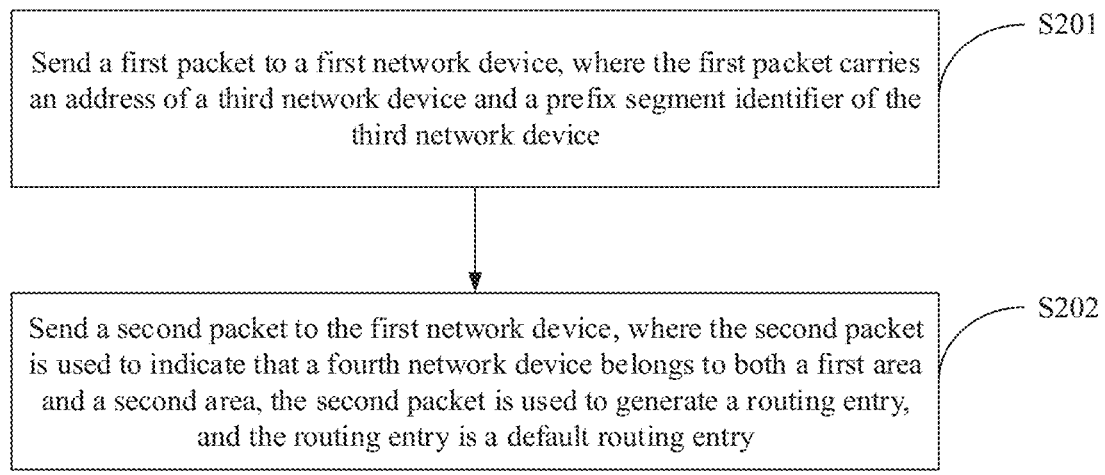
FIG. 3 is a schematic flowchart of a packet sending method according to an embodiment of this application.

FIG. 3 is a schematic flowchart of a packet sending method according to an embodiment of this application.

The packet sending method provided in this embodiment of this application may be applied to a second network device, and specifically includes the following step:

S201: Send a first packet to a first network device, where the first packet carries an address of a third network device and a prefix segment identifier of the third network device.

In this embodiment of this application, the first network device and the second network device belong to a first area, and the third network device belongs to a second area. Optionally, the first area is a carrier non-backbone area, and the second area is a carrier backbone area.

The address of the third network device is used to determine a routing entry corresponding to the third network device, and the routing entry includes an address of a next-hop network device of the first network device. The prefix segment identifier of the third network device and the address of the next-hop network device are used to generate a label forwarding entry of the first network device.

Optionally, a binding tlv field of the first packet carries the address of the third network device and the prefix segment identifier of the third network device.

Because the content of the foregoing step is basically similar to the content in the foregoing embodiment, details are not described herein again.

As described above, the second network device may be a fourth network device. In other words, the second network device is a cross-area network device, and belongs to both the first area and the second area. In this case, optionally, the packet sending method provided in this embodiment of this application may further include the following step:

S202: Send a second packet to the first network device, where the second packet is used to indicate that the second network device belongs to both the first area and the second area, the second packet is used to generate a routing entry, and the routing entry is a default routing entry.

Optionally, a value of an area attached bit of the second packet is used to indicate that the second network device belongs to both the first area and the second area.

For this step, refer to the foregoing description of the fourth network device. Details are not described herein again.

The following describes the technical solutions of this application by using a specific application scenario of an IS-IS protocol as an example.

Figure 4:
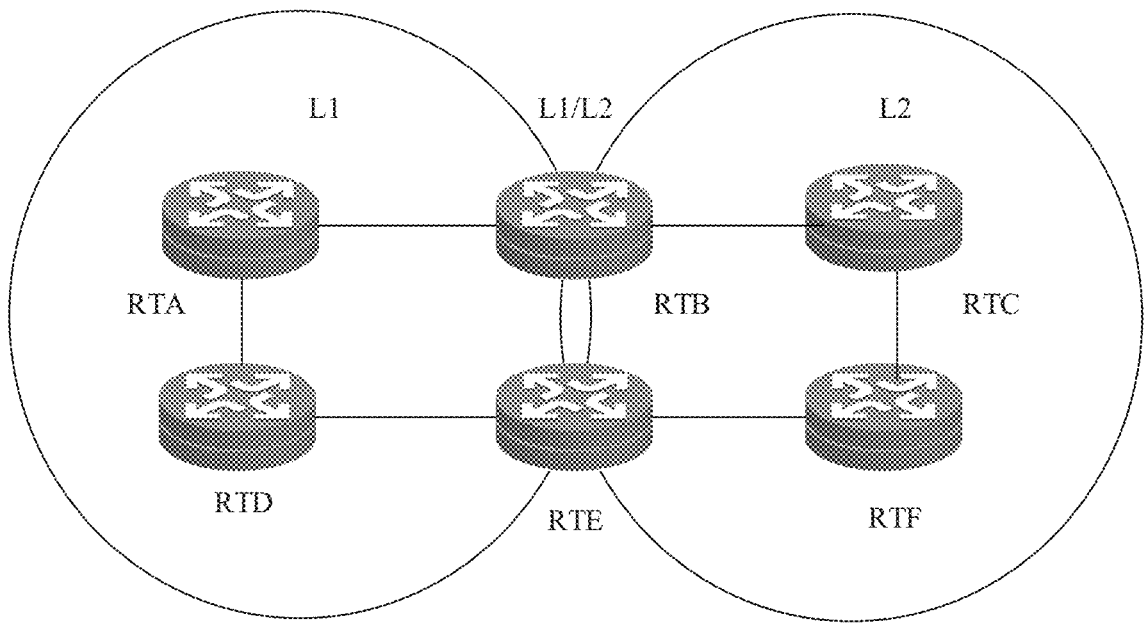
FIG. 4 is a schematic diagram of a topology of segment routing in an IS-IS protocol according to an embodiment of this application.

FIG. 4 is a schematic diagram of a topology of segment routing in an IS-IS protocol. In FIG. 4, an LI area includes a network device RTA, a network device RTD, a network device RTB, and a network device RTE, and an L2 area includes a network device RTC, a network device RTF, a network device RTB, and a network device RTE. In other words, the network device RTB and the network device RTE may communicate with both the network device RTC and the network device RTF in the L2 area and the network device RTA and the network device RTD in the L1 area, and are cross-area network devices. The network device RTA to the network device RTF are network devices having a segment routing capability.

Based on the IS-IS protocol, when flooding is performed in the L1 area, a network device in the L1 area may learn of routing information of the other network devices in the L area, and when flooding is performed in the L2 area, a network device in the L2 area may learn of routing information of the other network devices in the L2 area.

For example, in FIG. 4, when flooding is performed in the L1 area, any one of the network device RTA, the network device RTB, the network device RTD, and the network device RTE may learn of the routing information of the other network devices in the L1 area, and when flooding is performed in the L2 area, any one of the network device RTB, the network device RTC, the network device RTE, and the network device RTF may learn of the routing information of the other network devices in the L2 area.

However, a difference between a carrier non-backbone area and a carrier backbone area lies in that a network device in the carrier backbone area can obtain routing information of a network device in the carrier non-backbone area through flooding by a cross-area network device, but a network device in the carrier non-backbone area cannot obtain, through flooding, routing information of a network device in the carrier backbone area that is stored in the cross-area network device.

For example, in FIG. 4, the network device RTB and the network device RTE may obtain the routing information of the network device RTA and the network device RTD through flooding in the L1 area, and the network device RTC and the network device RTF may obtain the routing information of the network device RTA and the routing information of the network device RTD that are stored in the network device RTB or the network device RTE through flooding in the L2 area. Therefore, the network device RTC and the network device RTF may actively initiate access to the network device RTA or the network device RTD. However, the network device RTA and the network device RTD cannot obtain the routing information of the network device RTC and the routing information of the network device RTF through flooding.

It is assumed that a source network device is the network device RTA, and a target network device is the network device RTC. In this case, any one of the network device RTB, the network device RTE, and the network device RTD may be configured as a mapping server, and an address 3.3.3.3 and a prefix segment identifier 3 of the network device RTC are configured in the mapping server. Then, a first LSP packet is generated, and a binding TLV field of the first LSP packet carries the address 3.3.3.3 and the prefix segment identifier 3 of the network device RTC. Next, the first LSP packet is flooded in the carrier non-backbone area, so that the network device RTA can receive the first LSP packet.

After receiving the first LSP packet, the network device RTA searches for an initial SRGB value of the network device RTA. Because an SRGB range of the network device RTA is 100 to 200, the initial SRGB value of the network device RTA is 100. After the initial SRGB value is found, the initial SRGB value is added to the prefix segment identifier 3 of the network device RTC, to obtain a local label 103 corresponding to the address 3.3.3.3.

Because the network device RTB and the network device RTE are cross-area network devices, the two network devices each may advertise, through flooding, an LSP packet carrying an ATT bit in L1. The network device RTA is separately connected to the network device RTB and the network device RTD, and the network device RTD is connected to the network device RTE. Therefore, after receiving a second LSP packet that is sent by the network device RTB and that carries an ATT bit, and a third LSP packet that is sent by the network device RTD and that carries an ATT bit, the network device RTA learns, through calculation according to a shortest path algorithm, that a cross-area network device closer to the network device RTA is the network device RTB. Therefore, the network device RTA determines that a next-hop network device is the network device RTB, and generates a default routing address 0.0.0.0 of a default routing entry based on the second LSP packet, where an outbound interface points to the network device RTB. A value of the ATT bit of the second LSP packet may be the same as a value of the ATT bit of the third LSP packet.

A routing table is searched based on the address of the network device RTC, the default routing entry is found according to a longest mask match principle, the default routing address and the next-hop network device RTB are found, an SRGB range 200 to 300 of the network device RTB that is obtained in advance through intra-area flooding is searched, and an outgoing label 203 of the next-hop network device is generated based on an initial SRGB of the network device RTB and the prefix segment identifier 3 of the network device RTC.

Therefore, a label forwarding entry of the network device RTA includes the following information:

a destination address: 3.3.3.3; a local label: 103 an outbound interface: an outbound interface corresponding to the default routing address; and an outgoing label of a next-hop network device: 203.

Because both the network device RTB and the network device RTC are located in the L2 area, the network device RTB may obtain the address and the prefix segment identifier of the network device RTC, and generate a label forwarding entry.

The label forwarding entry of the network device RTB includes the following information:

a destination address: 3.3.3.3; a local label: 203; an outbound interface: an outbound interface pointing to the network device RTC; and an outgoing label of a next-hop network device: 303 (an initial SRGB value 300 of the network device RTC plus 3).

A label forwarding entry of the network device RTC includes the following information:

a destination address: 3.3.3.3; a local label: 303; an outbound interface; a local interface; and an outgoing label of a next-hop network device: null.

When the network device RTA needs to send a third packet to the network device RTC, the network device RTA first searches the label forwarding entry of the network device RTA for the corresponding outbound interface and the label 203 of the next-hop network device based on the destination address 3.3.3.3, pushes the label 203 of the next-hop network device into the third packet, and sends the third packet to the network device RTB based on the outbound interface corresponding to the default route 0.0.0.0.

After receiving the third packet carrying the outgoing label 203, the network device RTB searches the label forwarding entry of the network device RTB for the outbound interface corresponding to the local label 203 and the label 303 of the next-hop network device, performs label switching, that is, the third packet carries the outgoing label 303, and sends the third packet to the network device RTC through the outbound interface corresponding to the address of the next-hop network device.

After receiving the third packet carrying the outgoing label 303, the network device RTC searches the label forwarding entry of the network device RTC, to learn that the outgoing label is null, that is, confirms that a destination network device of the third packet is the network device RTC, so as to complete forwarding of the third packet.

In general, the entire process does not change a relationship between the L1 area and the L2 area. When the network device RTC or the network device RTF in the L2 area flaps, the network device RTA and the network device RTD in the L1 area are not affected, so as to ensure stability of the L1 area. In addition, the network device RTA does not need to store the routing information of the network device RTF, and the network device RTD does not need to store the routing information of the network device RTC and the network device RTF, so as to reduce storage pressure of the network device RTA and the network device RTD.

Figure 5:
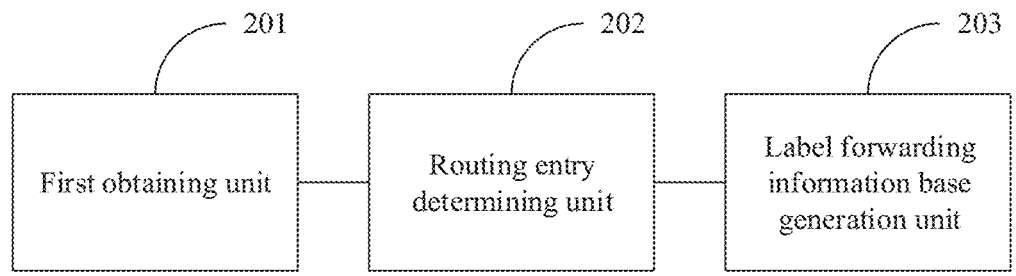
FIG. 5 is a structural block diagram of a label forwarding entry generation apparatus according to an embodiment of this application.

FIG. 5 is a structural block diagram of a label forwarding entry generation apparatus according to an embodiment of this application.

The label forwarding entry generation apparatus provided in this embodiment of this application may be applied to a first network device that performs the label forwarding entry generation method shown in FIG. 2. The apparatus specifically includes:

a first obtaining unit 201, configured to obtain a first packet sent by a second network device, where the first packet carries an address of a third network device and a prefix segment identifier of the third network device, the first network device and the second network device belong to a first area, and the third network device belongs to a second area;

a routing entry determining unit 202, configured to determine a routing entry that matches the address of the third network device, where the routing entry includes an address of a next-hop network device of the first network device; and a label forwarding entry generation unit 203, configured to generate a label forwarding entry based on the prefix segment identifier and the address of the next-hop network device.

Optionally, the label forwarding entry generation unit is specifically configured to:

determine a segment routing global block of the next-hop network device based on the address of the next-hop network device; and generate a label of the next-hop network device in the label forwarding entry based on the segment routing global block of the next-hop network device and the prefix segment identifier.

Optionally, the apparatus further includes:

a routing entry generation unit, configured to: receive a second packet, where the second packet is used to indicate that a fourth network device belongs to both the first area and the second area; and generate the routing entry in response to receiving the second packet, where the routing entry is a default routing entry.

Optionally, the apparatus further includes:

a correspondence establishment unit, configured to establish a correspondence between the routing entry and the label forwarding entry;

a third packet receiving unit, configured to receive a third packet, where a destination address of the third packet is the address of the third network device;

a matching unit, configured to: find the routing entry based on the address of the third network device, and push the label of the next-hop network device in the label forwarding entry into the third packet based on the correspondence; and a first sending unit, configured to send the third packet into which the label of the next-hop network device is pushed to the next-hop network device of the first network device.

Optionally, the label forwarding entry includes the address of the third network device. The apparatus further includes:

a third packet receiving unit, configured to receive a third packet, where a destination address of the third packet is the address of the third network device;

a search unit, configured to search, based on the address of the third network device, the label forwarding information for the label of the next-hop network device that corresponds to the address of the third network device; and a second sending unit, configured to: push the label of the next-hop network device into the third packet, and send the third packet into which the label of the next-hop network device is pushed to the next-hop network device of the first network device.

Figure 6:
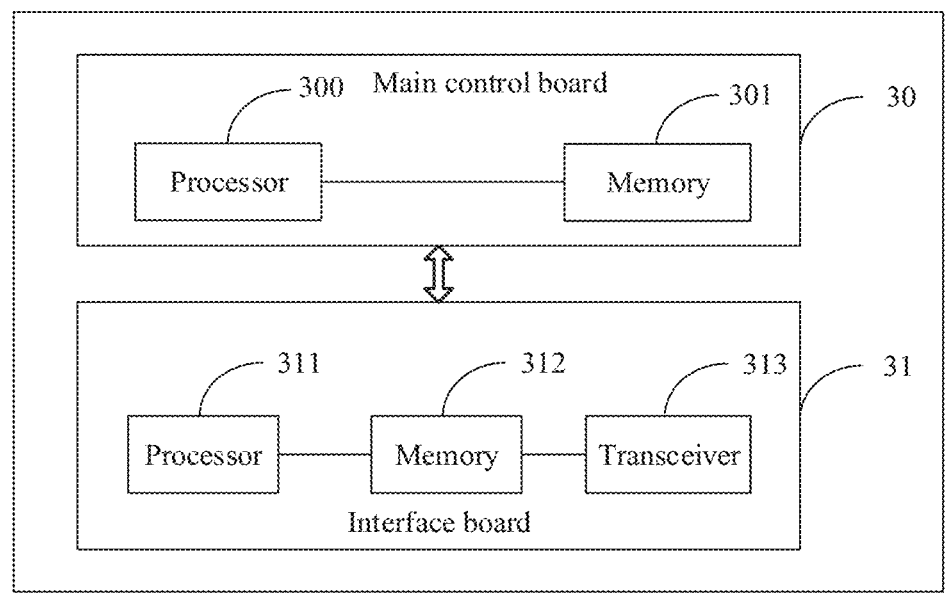
FIG. 6 is a diagram of a hardware architecture of a network device according to an embodiment of this application.

FIG. 6 is a structural block diagram of a packet sending apparatus according to an embodiment of this application.

The packet sending apparatus provided in this embodiment of this application is applied to a second network device that performs the packet sending method shown in FIG. 3. The apparatus includes:

a first packet sending unit, configured to send a first packet to a first network device, where the first packet carries an address of a third network device and a prefix segment identifier of the third network device, the first network device and the second network device belong to a first area, the third network device belongs to a second area, the address of the third network device is used to determine a routing entry corresponding to the third network device, the routing entry includes an address of a next-hop network device of the first network device, and the prefix segment identifier of the third network device and the address of the next-hop network device are used to generate a label forwarding entry of the first network device.

Optionally, a value of an area attached bit of the second packet is used to indicate that the second network device belongs to both the first area and the second area.

Optionally, a binding type-length-value field of the first packet carries the address of the third network device and the prefix segment identifier of the third network device.

Optionally, the first area is a carrier non-backbone area, and the second area is a carrier backbone area.

An embodiment of this application further provides a network device. The network device is a second network device. The network device includes a memory and a processor. The memory is configured to store an instruction. The processor is configured to execute the instruction in the memory, to perform the packet sending method.

FIG. 6 is a diagram of a hardware architecture of a network device (a first network device to a fifth network device) according to an embodiment of this application.

The network device may include a main control board 30 and an interface board 31. The main control board 30 includes a processor 300 and a memory 301, and the processor 300 and the memory 301 are connected to each other. The interface board 31 includes a processor 311, a memory 312, and a transceiver 313. The processor 311, the memory 312, and the transceiver 313 are connected. The interface board 31 is coupled to the main control board 30.

The transceiver 313 is mainly configured to send and receive a packet. The memory 312 in the interface board 31 usually stores a label forwarding entry and a routing table, and the processor 311 is usually configured to obtain a source or a destination of the packet by searching the routing table and the label forwarding entry.

The processor 300 in the main control board 30 is configured to invoke an application program stored in the memory 301, to perform corresponding processing on a received packet based on a source of the packet, or generate a new packet.

For the first network device, the interface board 31 in the first network device is configured to, obtain, through the transceiver 313, a first packet sent by a second network device, find, based on a routing table stored in the memory 312, a routing entry that matches an address of a third network device, and send the routing entry to the processor 300 in the main control board 30. The processor 300 is configured to: generate a label forwarding entry based on a prefix segment identifier and an address of a next-hop network device, and store the label forwarding entry in the memory 312.

For the second network device, the main control board 30 in the second network device may be configured to: configure information that needs to be carried in the first packet, and send the first packet through the interface board 31.

Figure 7:
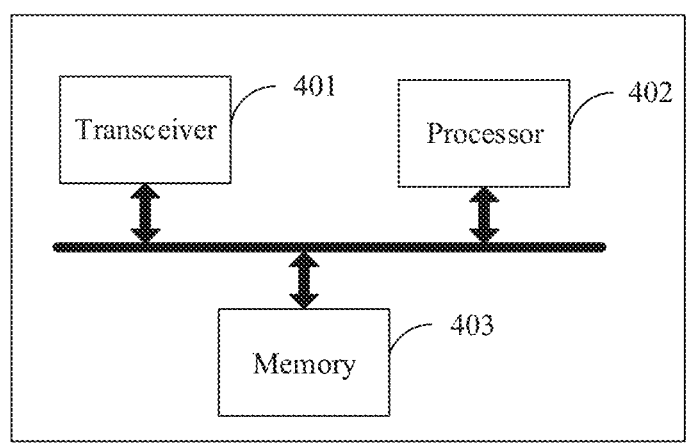
FIG. 7 is another diagram of a hardware architecture of a network device according to an embodiment of this application.

FIG. 7 is another diagram of a hardware architecture of a network device (a first network device to a fifth network device) according to an embodiment of this application.

The network device may include a transceiver 401, a processor 402, and a memory 403. The transceiver 401, the processor 402, and the memory 403 are connected to a bus.

The processor 300, the processor 311, and the processor 402 each may be, for example, a central processing unit (CPU), a general-purpose processor, a digital signal processor (DSP), an application-specific integrated circuit (ASIC), a field programmable gate array (FPGA) or another programmable logic component, a transistor logic component, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The memory 301, the memory 312, and the memory 403 each may be a random-access memory (RAM), a flash memory, a read-only memory (ROM), an erasable programmable read-only memory (EPROM), an electrically erasable programmable read-only memory (EEPROM), a register, a hard disk, a removable hard disk, a CD-ROM, or any other form of storage medium known to a person skilled in the art.

The transceiver 313 and the transceiver 401 each may be, for example, an interface card, or may be an Ethernet interface or an asynchronous transfer mode (ATM) interface.

An embodiment of this application further provides a computer-readable storage medium, including an instruction. When the instruction is run on a computer, the computer is enabled to perform the label forwarding entry generation method.

An embodiment of this application further provides a computer-readable storage medium, including an instruction. When the instruction is run on a computer, the computer is enabled to perform the packet sending method.

An embodiment of this application further provides a computer program product including an instruction. When the computer program product is run on a computer, the computer is enabled to perform the label forwarding entry generation method.

An embodiment of this application further provides computer program product including an instruction. When the computer program product is run on a computer, the computer is enabled to perform the packet sending method.

In the specification, claims, and accompanying drawings of this application, the terms "first", "second", "third", "fourth", and the like (if existent) are intended to distinguish between similar objects, but do not necessarily indicate a specific order or sequence. It should be understood that the data termed in such a way are interchangeable in proper circumstances so that the embodiments of the present invention described herein may be implemented in other orders than the order illustrated or described herein. Moreover, the terms "include", "contain", and any other variants mean to cover a non-exclusive inclusion, for example, a process, method, system, product, or device that includes a list of steps or units is not necessarily limited to those steps or units that are clearly listed, but may include other steps or units that are not clearly listed or that are inherent to such a process, method, system, product, or device.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for enabling a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A label forwarding entry generation method, applied to a first network device, wherein the method comprises:
    obtaining a first packet sent by a second network device, wherein the first packet carries an address of a third network device and a prefix segment identifier of the third network device, the first network device and the second network device belong to a first area, and the third network device belongs to a second area;
    determining a routing entry that matches the address of the third network device, wherein the routing entry comprises an address of a next-hop network device of the first network device; and
    generating a label forwarding entry based on the prefix segment identifier and the address of the next-hop network device, wherein the generating the label forwarding entry based on the prefix segment identifier and the address of the next-hop network device comprises:
        determining a segment routing global block of the next-hop network device based on the address of the next-hop network device; and
        generating a label of the next-hop network device in the label forwarding entry based on the segment routing global block of the next-hop network device and the prefix segment identifier, wherein the label is generated based on a sum of an initial value of the segment routing global block and the prefix segment identifier.

2. The method according to claim 1, wherein the method further comprises:
    receiving a second packet, wherein the second packet is used to indicates that a fourth network device belongs to both the first area and the second area; and
    generating the routing entry in response to receiving the second packet, wherein the routing entry is a default routing entry.

3. The method according to claim 2, wherein a value of an area attached bit of the second packet indicates that the fourth network device belongs to both the first area and the second area.

4. The method according to claim 1, wherein the method further comprises:
    establishing a correspondence between the routing entry and the label forwarding entry;
    receiving a third packet, wherein a destination address of the third packet is the address of the third network device;
    finding the routing entry based on the address of the third network device, and pushing the label of the next-hop network device in the label forwarding entry into the third packet based on the correspondence; and
    sending the third packet including the pushed label of the next-hop network device to the next-hop network device of the first network device.

5. The method according to claim 1, wherein the label forwarding entry further comprises the address of the third network device, and wherein the method further comprises:
    receiving a third packet, wherein a destination address of the third packet is the address of the third network device;
    searching, based on the address of the third network device, the label forwarding entry for the label of the next-hop network device that corresponds to the address of the third network device;
    pushing the label of the next-hop network device into the third packet; and
    sending the third packet including the pushed label of the next-hop network device to the next-hop network device of the first network device.

6. The method according to claim 1, wherein a binding type-length-value field of the first packet carries the address of the third network device and the prefix segment identifier of the third network device.

7. The method according to claim 1, wherein the first area is a carrier non-backbone area, and the second area is a carrier backbone area.

8. A packet sending method, applied to a second network device, wherein the method comprises:
sending a first packet to a first network device, wherein the first packet carries an address of a third network device and a prefix segment identifier of the third network device, the first network device and the second network device belong to a first area, the third network device belongs to a second area, the address of the third network device is used to determine a routing entry corresponding to the third network device, the routing entry comprises an address of a next-hop network device of the first network device, and the prefix segment identifier of the third network device and the address of the next-hop network device are used to generate a label forwarding entry of the first network device, wherein the label is generated based on a sum of the prefix segment identifier and an initial value of a segment routing global block of the next-hop network device.

9. The method according to claim 8, wherein the second network device further belongs to the second area, and the method further comprises:
sending a second packet to the first network device, wherein the second packet is used to indicates that the second network device belongs to both the first area and the second area, the second packet is used to generate the routing entry, and the routing entry is a default routing entry.

10. The method according to claim 9, wherein a value of an area attached bit of the second packet indicates that a fourth network device belongs to both the first area and the second area.

11. The method according to claim 8, wherein a binding type-length-value field of the first packet carries the address of the third network device and the prefix segment identifier of the third network device.

12. The method according to claim 8, wherein the first area is a carrier non-backbone area, and the second area is a carrier backbone area.

13. A label forwarding entry generation apparatus, applied to a first network device, comprising:
at least one processor; and
one or more memories coupled to the at least one processor and storing instructions for execution by the at least one processor, the instructions instruct the at least one processor to cause the first network device to:
obtain a first packet sent by a second network device, wherein the first packet carries an address of a third network device and a prefix segment identifier of the third network device, the first network device and the second network device belong to a first area, and the third network device belongs to a second area;
determine a routing entry that matches the address of the third network device, wherein the routing entry comprises an address of a next-hop network device of the first network device; and
generate a label forwarding entry based on the prefix segment identifier and the address of the next-hop network device, wherein the instructions further instruct the at least one processor to cause the first network device to:
determine a segment routing global block of the next-hop network device based on the address of the next-hop network device; and
generate a label of the next-hop network device in the label forwarding entry based on the segment routing global block of the next-hop network device and the prefix segment identifier, wherein the label is generated based on a sum of an initial value of the segment routing global block and the prefix segment identifier.

14. The apparatus according to claim 13, wherein the instructions further instruct the at least one processor to cause the first network device to:
receive a second packet, wherein the second packet indicates that a fourth network device belongs to both the first area and the second area; and
generate the routing entry in response to receiving the second packet, wherein the routing entry is a default routing entry.

15. The apparatus according to claim 13, wherein the instructions further instruct the at least one processor to cause the first network device to:
establish a correspondence between the routing entry and the label forwarding entry;
receive a third packet, wherein a destination address of the third packet is the address of the third network device;
find the routing entry based on the address of the third network device;
push the label of the next-hop network device in the label forwarding entry into the third packet based on the correspondence; and
send the third packet including the pushed label of the next-hop network device to the next-hop network device of the first network device.

16. The apparatus according to claim 13, wherein the label forwarding entry comprises the address of the third network device, and wherein the instructions further instruct the at least one processor to cause the first network device to:
receive a third packet, wherein a destination address of the third packet is the address of the third network device;
search, based on the address of the third network device, the label forwarding entry for the label of the next-hop network device that corresponds to the address of the third network device;
push the label of the next-hop network device into the third packet; and
send the third packet including the pushed label of the next-hop network device to the next-hop network device of the first network device.

17. A packet sending apparatus, applied to a second network device, comprising:
at least one processor; and
one or more memories coupled to the at least one processor and storing instructions for execution by the at least one processor, the instructions instruct the at least one processor to cause the second network device to:
send a first packet to a first network device, wherein the first packet carries an address of a third network device and a prefix segment identifier of the third network device, the first network device and the second network device belong to a first area, the third network device belongs to a second area, the address of the third network device is used to determine a routing entry corresponding to the third network device, the routing entry comprises an address of a next-hop network device of the first network device, and the prefix segment identifier of the third network device and the address of the next-hop network device are used to generate a label forwarding entry of the first network device, wherein the label is generated based on a sum of the prefix segment identifier and an initial value of a segment routing global block of the next-hop network device.

18. The apparatus according to claim 17, wherein a value of an area attached bit of the first packet is used to indicates that the second network device belongs to both the first area and the second area.

* * * * *

UNITED STATES PATENT AND TRADEMARK OFFICE
CERTIFICATE OF CORRECTION

| | |
|---|---|
| PATENT NO. | : 11,431,633 B2 |
| APPLICATION NO. | : 17/136590 |
| DATED | : August 30, 2022 |
| INVENTOR(S) | : Shusong Yu |

It is certified that error appears in the above-identified patent and that said Letters Patent is hereby corrected as shown below:

In the Specification

In Column 20, In Line 24-25, In Claim 2, after "packet" delete "is used to".

In Column 21, In Line 27, In Claim 9, after "packet" delete "is used to".

In Column 23, In Line 5, In Claim 18, after "packet" delete "is used to".

Signed and Sealed this
Twenty-fifth Day of April, 2023

Katherine Kelly Vidal
*Director of the United States Patent and Trademark Office*